Patented Apr. 18, 1944

2,346,992

UNITED STATES PATENT OFFICE 2,346,992

PERMANENTLY REFUSIBLE ZINC RESINATE AND METHOD OF PREPARING SAME

Robert C. Palmer and Edwin Edelstein, Pensacola, Fla., assignors to Newport Industries, Inc., Pensacola, Fla., a corporation of Delaware No Drawing. Application October 7, 1942, Serial No. 461,233

21 Claims. (Cl. 260—105)

This application is a continuation-in-part of the application by Robert C. Palmer, Anthony F. Oliver, and Edwin Edelstein, Serial No. 297,108, filed September 29, 1939, and entitled "Resinlike product and process of making the same."

This invention relates to zinc resinates and to a method of preparing such compounds by reactions carried out in solvent media.

By a "reaction carried out in a solvent medium" we mean a reaction carried out in a normally liquid solvent medium that can be recovered after the reaction is completed.

The term "resinate" is herein applied generally to include the salts of any of the resin acids, for instance, abietic, pimaric, or sapinic acids or polymers or isomers thereof. Rosin containing one or more of these resin acids may be reacted as disclosed hereinbelow with a zinc compound to form the corresponding zinc resin acid salts.

As far as we know, clear, permanently refusible zinc resinates having a high zinc content and capable of forming stable, non-gelling solutions have heretofore not been prepared.

The term "permanent refusibility" as applied herein to resin-like products, means a capacity for being repeatedly fused and solidified, without any change in the characteristic appearance of the products, provided that the temperatures to which the products are subjected are kept below those temperatures at which substantial decomposition occurs.

By "stable, non-gelling solutions" we mean solutions of resinous products in petroleum solvents and the like that do not gel when the solutions are heated to any temperatures short of their boiling points. By "gelling" we signify thickening of a flowable solution by heating while a substantially constant concentration of solids is maintained therein, the solution finally becoming, in some cases, almost non-flowing at room temperatures, and sometimes accompanied by the appearance of insoluble matter or precipitate.

By the term "clarity" as applied to our products we mean a transparency due to the substantially complete absence of any unreacted zinc oxide or other zinc compound used in preparing the resin-like products to which this invention pertains. Such unreacted zinc compounds, if present, would, of course, tend to render the resin-like products opaque rather than transparent. The transparency of the resinate itself is an important characteristic of our products, even though for some purposes opacifying agents may be incorporated therein.

In referring to resinates having a high zinc content, we do not mean to limit ourselves to basic or even to neutral zinc resinates but to include slightly acid zinc resinates. When the neutral, acid or basic character of a zinc oxide-rosin reaction product is referred to, the designated character of the reaction product as a whole is meant. This is done to avoid controversy over whether the zinc resinate itself may not be present in the reaction product as a basic zinc resinate even when the reaction product as a whole has an acid or neutral character.

One reason why those skilled in the art have heretofore not been able to prepare permanently refusible zinc resinates having a high zinc content and distinguished by high clarity and capacity for forming stable, non-gelling solutions, is the fact that ordinary rosin reacts only with difficulty, if at all, with zinc oxide and the like at temperatures falling below the decomposition temperature of the rosin. The reaction, even if initiated, does not go to completion but ceases long before a calculated neutrality has been effected. The acid zinc resinates of the prior art containing relatively small amounts of combined zinc are also characterized by infusibility and by the instability of their solutions in petroleum solvents and the like.

We have now found that the reaction in a solvent medium between rosin containing material and zinc oxide and the like can be carried so far as to produce even basic resinates if a suitable acidic catalyst such as a low molecular weight fatty acid is incorporated with the reacting mass.

We have further found that zinc resinates of high zinc content and distinguished by permanent refusibility, high clarity and capacity for forming stable, non-gelling solutions can be prepared by reacting resin containing material including at least about 7½% of a rosin polymer with zinc oxide in proportions disclosed hereinbelow. This reaction is carried out in a solvent medium and from the stable solutions thus obtained the solvent can be removed to leave clear, permanently refusible, high melting point resinates that may be slightly acid, neutral or basic. These resinates have physical properties resembling those of typical resins, being characterized, for instance, by a conchoidal fracture.

The polymer content of about 7½% indicated in the preceding paragraphs is necessarily only an approximation to the actual value of the critical polymer content. The only method available for an estimation of the polymer content of a rosin is a molecular weight determination. A molecular weight determination can serve as a basis for the calculation of the polymer content of a rosin only when the normal molecular weight of the unpolymerized rosin fraction is known. Actually, the molecular weight of the unpolymerized fraction varies according to the nature of the starting rosin-containing material used and according to the method of preparation of the rosin-containing material as well as the nature of any treatment to which the rosin-containing material may have been subjected. The given figure of 7½% represents a value arrived at by estimating the amount of polymer required upon the basis of experimental data. A series of experiments were run in which various amounts of a commercial polymerized rosin known as "Nuroz," which may contain from 25 to 40% of polymer, were blended with natural "WW" wood rosin in various proportions. The resulting blends were used as starting materials in the preparation of resinates, the stability, refusibility and clarity of which were then determined.

There is apparently a definite relationship between the non-gelling of the solutions of the novel resinates of the present invention and the permanent refusibility of the novel resin-like products of this invention, for gelling solutions are apparently formed only from products which are not permanently refusible and, conversely, all permanently refusible products form stable, non-gelling solutions.

The value of our zinc resinates lies not so much in their high zinc content for its drier effect as in making available novel, high melting point synthetic resin-like products for use as substitutes for or in conjunction with known synthetic resins, such as ester gum, alkyd and phenolic resins and their modifications. The permanently refusible resin-like products of our invention impart added properties of hardness, through drying, gloss, improved pigment dispersion and other valuable characteristics to varnish, enamels, inks and similar coatings.

It is therefore an important object of our invention to provide novel, high melting point resin-like products of a permanently refusible character and capable of forming stable, non-gelling solutions in petroleum solvents, the products being clear resinates of zinc high in zinc content and being substantially free of uncombined metal and having the valuable properties of imparting hardness, through drying, improved pigment dispersion and other desirable characteristics to varnish, enamels, inks and similar coatings.

It is a further important object of this invention to provide a method for the preparation of such resin-like products from partially polymerized rosins, such as chemically polymerized rosins and the like.

It is a further important object of this invention to provide a method of making a substantially neutral or basic zinc resinate having permanently refusible characteristics and capable of forming stable, non-gelling solutions in petroleum solvents and the like.

Other and further important objects of this invention will become apparent from the following description and appended claims.

The starting material for our process may be a partially polymerized gum rosin, pine oleoresin or wood rosin, or a partially polymerized rosin that has also been subsequently heat treated or hydrogenated. A partially polymerized rosin can be produced by heat treatment, but for the purposes of our process it is not generally commercially practicable to make a rosin containing enough polymers to give the desired effect by heat treatment alone.

Partial polymerization may suitably be effected by means of a catalyst in accordance with the methods of such patents as those to Schnorf No. 2,074,192, to Rummelsburg, Nos. 2,108,928 and 2,124,675, and to Morton No. 2,017,866, or preferably, in accordance with the method described and claimed in the Palmer and Bibb Patent No. 2,247,399, filed September 28, 1938, and granted July 1, 1941. Since the products so obtained are generally referred to as polymerized rosins, that term will be used herein to designate polymerized rosins produced by the action of a polymerization catalyst and containing a substantial proportion of polymers of a resin acid.

It is possible to select a method from the patented chemical processes that will produce rosins containing almost any desired amount of polymer up to and including a substantially complete rosin dimer content. The amount of dimer, for instance, in the preferred example of the Palmer and Bibb Patent No. 2,247,399, having a capillary tube melting point of 75° to 80° C., may vary from 25 to 40%. Such a rosin is generally preferred for our process, as the amount of polymer necessary to give the desired result is thereby assured.

We have also successfully used natural gum and wood rosins to which has been added a rosin containing a substantial amount of a polymer, such as the product of the preferred example of the Palmer and Bibb Patent No. 2,247,399 sold commercially as "Nuroz." The effect of the polymer content upon the non-gelling of the resulting solution is indicated by the following experiment.

One part by weight of "Nuroz" was blended with 3 parts by weight of natural "WW" wood rosin, and the resulting mixture was dissolved to 60% concentration in mineral spirits. The solution was then reacted with 7% zinc oxide by weight of the rosin blend (wood rosin plus "Nuroz"). The resulting solution gelled when heated at 150° C. for two hours. A similar blend was prepared with 1 part by weight of "Nuroz" and two parts by weight of "WW" wood rosin. The resulting mixture was dissolved in mineral spirits and reacted with zinc oxide under identical conditions. The resulting solution did not gell when heat treated as described. Apparently a minimum proportion of polymer in the starting rosin of about 7.5% of rosin dimer, whether formed therein by heating rosin with a polymerization catalyst or by adding that proportion of dimer to a natural gum or wood rosin, is necessary to insure a stable, non-gelling solution of zinc resinate prepared by the method of this invention.

In accordance with our method any of such rosins is treated with zinc oxide or zinc hydroxide in the presence of a solvent for the rosin such as a liquid hydrocarbon, for instance, a terpene hydrocarbon or a coal tar solvent on the order of toluene and xylene. The preferred solvents are petroleum distillates, in particular, mineral spirits or petroleum naphtha. The rosin concentration for best results is suitably, but not necessarily, at least 50% by weight of the resultant solution, a preferred range being between 60 and 75%. A catalyst is incorporated with the solution, acetic acid being preferred. Any of the catalysts enumerated in the patent to Romaine et al. No. 1,884,407 may be employed, however, especially catalysts selected from the group consisting of organic acids soluble in rosin at the reaction temperature whose acidity is due to a carboxylic acid radical, organic acids soluble in rosin at the reaction temperature whose acidity is of a phenolic nature, and salts of said acids capable of reacting with abietic acid to liberate said acids, such as formic acid, lactic acid, tartaric acid, citric acid, or a metal salt (including ammonium salts) of these or other carboxylic acids, in particular, low molecular weight fatty acids.

The amount of catalyst to be added is in the neighborhood of ⅓ to 1% by weight of the rosin but may rise as high as 4%. Without a catalyst the reaction between the polymerized rosin and zinc oxide will not ordinarily be initiated.

The solution containing the added catalyst is then heated, preferably to a temperature of from 100° to 150° C., although temperatures below 100° C. are also operative, and zinc oxide is added either dry or, preferably, in a slurry of the solvent. The rosin solution is agitated during the addition of the zinc oxide and agitation is continued until the reaction has been completed. When all of the zinc oxide has reacted, the solution becomes clear.

When a partially polymerized rosin, for instance, a catalytically polymerized rosin, is thus reacted with zinc oxide or zinc hydroxide, a stable, non-gelling solution of a permanently refusible zinc resinate may be obtained without adding stabilizers such as calcium oxide or calcium hydroxide that form a mixed zinc-calcium resinate.

The following will serve to illustrate a preferred method of making a stable, non-gelling solution of a permanently refusible zinc resinate in a petroleum solvent:

*Example*

If a solution of a basic zinc oxide-rosin reaction product is desired, we prefer to start with a catalytically polymerized rosin.

The starting material may be suitably a rosin that has been polymerized by subjecting an anhydrous 60% solution of wood rosin (color grade WW) in a petroleum solvent (boiling between 105 and 140° C.) to a temperature of about 128 to 138° C. and to the action of 1½% of zinc chloride by weight of the rosin for 12 to 16 hours. After washing to remove zinc compounds, the polymerized rosin, recovered by steaming off the solvent at about 210 to 220° C., will be generally found to have the following properties:

| | |
|---|---|
| Color | WG |
| Melting point °C | 75 to 80 |
| Acid value | 164 to 167 |
| Rotation | −4 to −8 |
| Ash Per cent | Less than 0.01 |

60 parts by weight of this polymerized pale wood rosin are dissolved in 40 parts by weight of mineral spirits (a petroleum distillate having a boiling range between about 150 and 200° C.); about 0.3 part by weight of acetic acid (100%) are added and the solution is heated to between 100° and 150° C. and, while agitating the solution, zinc oxide is added as a slurry of zinc oxide in a small amount of mineral spirits.

The amount of zinc oxide to be added will depend upon the acid value of the polymerized rosin employed and also upon whether an acid, neutral or basic zinc oxide-rosin reaction product is desired. Assuming that the rosin has an acid value of 160, 11.55% of zinc oxide (ZnO) by weight of the rosin will be required theoretically to give a neutral, or normal zinc oxide-rosin reaction product.

Accordingly, if a substantially neutral zinc oxide-rosin reaction product is desired, about 11.5 parts by weight of zinc oxide should be added to the rosin solution. If a basic zinc oxide-rosin reaction product is desired, more than 11.5% of zinc oxide by weight of the rosin should be added. 13% of zinc oxide gives a zinc oxide-rosin reaction product having a calculated basicity equivalent to 16 acid value. 15.0% of zinc oxide gives a zinc resinate having a calculated basicity equivalent to almost 48 acid value. Where more than 11.5% of zinc oxide is to be reacted, a larger percentage of catalyst may be necessary. For instance, if as much as 24% of zinc oxide is to be reacted, the amount of acetic acid used might be increased to 4%. When using from 14 to 15% of zinc oxide, we found it advisable to use 0.5 to 1% of acetic acid. The zinc acetate acts as a stabilizing agent.

In general, we contemplate reacting a polymerized rosin with at least 5% and not over 15% of zinc oxide.

On the basis of substantially complete reaction, the reaction products of rosin and 5, 6, 12 and 15% of zinc oxide contain about 3.8%, 4.6%, 8.8% and 10.8%, respectively, of reacted zinc.

Throughout this specification and in the claims, where percentages are referred to, percentages by weight are intended unless otherwise specified. In the case of reacting proportions of zinc oxide, the percentages expressed in the claims are based on the weight of the rosin acid-containing material. The rosins that we prefer to use have acid values of the order of 150–160, but if the rosin acid-containing material to be used were found to have a considerably lower or higher acid value, the percentages of zinc oxide would be proportionately lower or higher than the percentages herein specified. In general, we contemplate reacting a polymerized rosin with at least 5% and not over 15% of zinc oxide.

After the addition of the zinc oxide, agitation is continued until the zinc oxide has all reacted, as indicated by the solution becoming clear. At this point the heating is discontinued if a clear, stable, non-gelling solution of a zinc resinate in a petroleum solvent is desired. Alternatively, a clear, permanently refusible resin having a conchoidal fracture can be recovered from this solution by heating to distill off the solvent, preferably by heating to 200° C. and then steam distilling below 250° C.

A clear, permanently refusible resin having a melting point of about 142° C. can be recovered from a stable solution of a basic zinc oxide-rosin reaction product having a calculated basicity of about 48 acid value, by evaporating the solvent.

When the resin-like products of our invention are prepared as therein described and recovered in solid form, they are perfectly clear because free from any substantial amount of unreacted zinc oxide. This is not true, to the best of our knowledge, of prior art products that contain as much as 3.8% of combined zinc.

It will, of course, be understood that various details of the process may be varied through a wide range without departing from the principles of this invention and it is, therefore, not the purpose to limit the patent granted hereon otherwise than necessitated by the scope of the appended claims.

We claim as our invention:

1. The method of preparing a zinc resinate in the form of a high melting point, permanently refusible, resin-like product which comprises dissolving in a solvent a rosin containing at least about 7½% rosin polymer, incorporating into the resulting solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding to the solution a zinc compound selected from the group consisting of the oxide and hydroxide in an amount equivalent at least to 5% zinc oxide by weight of said rosin, heating the resulting mass to a temperature and for a time sufficient to complete the reaction between said rosin and the zinc oxide, and finally distilling off said solvent to recover the resin-like product remaining.

2. The method of preparing a zinc resinate in the form of a high melting point, permanently refusible, resin-like product which comprises dissolving in a solvent a rosin containing at least about 7½% rosin polymer, incorporating into the resulting solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding at least 5% and not over 15% zinc oxide by weight of said rosin to the solution, heating the resulting mass to a temperature and for a time sufficient to complete the reaction between said rosin and the zinc oxide, and finally steam distilling off said solvent to recover the resin-like product remaining.

3. The method of preparing a zinc resinate in the form of a high melting point, permanently refusible, resin-like product which comprises dissolving in a solvent a rosin containing at aelts about 7½% rosin polymer to form a solution containing at least 50% of rosin by weight of said solution, incorporating into the resulting solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding at least 5% zinc oxide by weight of said rosin to the solution, heating the resulting mass to a temperature of between 100° and 150° C. and for a time sufficient to complete the reaction between said rosin and the zinc oxide, and finally distilling off said solvent to recover the resin-like product remaining.

4. The method of preparing a zinc resinate in the form of a high melting point, permanently refusible, resin-like product which comprises dissolving in mineral spirits a rosin containing at least about 7½% rosin polymer to form a solution containing at least 50% of rosin by weight of said solution, incorporating into the resulting solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding at least 5% zinc oxide by weight of said rosin to the solution, heating the resulting mass to a temperature of between 100° and 150° C. and for a time sufficient to complete the reaction between said rosin and the zinc oxide, and finally distilling off said mineral spirits to recover the resin-like product remaining.

5. The method of preparing a zinc resinate in the form of a high melting point, permanently refusible, resin-like product which comprises dissolving in a solvent a rosin containing at least about 7½% rosin polymer, incorporating into the resulting solution an effective amount of acetic acid as a catalyst, adding at least 5% of zinc oxide by weight of said rosin to the solution, heating the resulting mass to a temperature and for a time sufficient to complete the reaction between said rosin and the zinc oxide, and finally distilling off said solvent to recover the resin-like product remaining.

6. The method of preparing a zinc resinate in the form of a high melting point, permanently refusible, resin-like product which comprises dissolving in a solvent a rosin containing at least about 7½% rosin polymer, incorporating into the resulting solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding at least 5% of zinc oxide by weight of said rosin to the solution, heating the solution to cause said reaction to go substantially to completion and finally distilling off said solvent to recover the resin-like product remaining.

7. The method of preparing a zinc resinate in the form of a high melting point, permanently refusible, resin-like product which comprises dissolving a rosin containing at least about 7½% rosin polymer in a solvent, incorporating into said solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding between 9 and 12% of zinc oxide by weight of said rosin thereto, heating the resultant mass to a temperature and for a time sufficient to complete the reaction between said rosin and the zinc oxide, and raising the temperature to about 200° C. and finally steam distilling off said solvent to recover the resin-like product remaining.

8. The method of preparing a zinc resinate in the form of a high melting point, permanently refusible, resin-like product which comprises dissolving a rosin containing at least about 7½% rosin polymer in a solvent, incorporating into said solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding between 12 to 15% of zinc oxide by weight of said rosin thereto, heating the resultant mass to a temperature and for a time sufficient to complete the reaction between said rosin and the zinc oxide, and raising the temperature to about 200°

C. and finally steam distilling off said solvent to recover the resin-like product remaining.

9. A zinc resinate in the form of a high melting point, permanently refusible, resin-like product having a conchoidal fracture and containing at least 3.8% of combined zinc.

10. A zinc resinate in the form of a high melting point, permanently refusible, resin-like product having a conchoidal fracture and containing from 3.8 to 10.8% of combined zinc.

11. A zinc resinate in the form of a permanently refusible, resin-like product having a melting point of about 142° C. and containing about 10.8% of combined zinc.

12. A zinc resinate in the form of a high melting point, permanently refusible, resin-like product having a conchoidal fracture and containing at least 3.8% of combined zinc together with at least about 7.5% of a rosin polymer.

13. A zinc resinate in the form of a high melting point, permanently refusible, resin-like product having a conchoidal fracture and containing from 3.8 to 10.8% of combined zinc together with at least about 7.5% of a rosin polymer.

14. A zinc resinate in the form of a permanently refusible, resin-like product having a melting point of about 142° C. and containing about 10.8% of combined zinc together with at least about 7.5% of a rosin polymer.

15. The method of preparing a stable, non-gelling solution of a zinc resinate capable of being isolated in the form of a high melting point, permanently refusible, resin-like product which comprises dissolving in a solvent a rosin containing at least about 7.5% of a rosin polymer, incorporating into the resulting solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding to the solution a zinc compound selected from the group consisting of the oxide and hydroxide in an amount equivalent to at least 5% zinc oxide, by weight of said rosin, and heating the resulting mass to a temperature and for a time sufficient to complete the reaction between said rosin and the zinc compound.

16. The method of preparing a stable, non-gelling solution of a zinc resinate capable of being isolated in the form of a high melting point, permanently refusible, resin-like product which comprises dissolving in a solvent a rosin containing at least about 7.5% of a rosin polymer, incorporating into the resulting solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding at least 5% and not over 15% zinc oxide by weight of said rosin to the solution, and heating the resulting mass to a temperature and for a time sufficient to complete the reaction.

17. The method of preparing a stable, non-gelling solution of a zinc resinate capable of being isolated in the form of a high melting point, permanently refusible, resin-like product which comprises dissolving in a volatile petroleum solvent a rosin containing at least about 7.5% of a rosin polymer to form a solution containing at least 50% of rosin by weight of said solution, incorporating into the resulting solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding at least 5% zinc oxide by weight of said rosin to the solution and heating the resulting mass to a temperature ranging from 100° to 150° C. and for a time sufficient to complete the reaction between said rosin and zinc oxide.

18. The method of preparing a stable, non-gelling solution of a zinc resinate capable of being isolated in the form of a high melting point, permanently refusible, resin-like product which comprises dissolving a rosin containing at least about 7.5% of a rosin polymer in a solvent, incorporating into said solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding between 9 and 12% of zinc oxide by weight of said rosin thereto, and heating the resultant mass to a temperature and for a time sufficient to complete the reaction between said rosin and zinc oxide.

19. The method of preparing a stable, non-gelling solution of a zinc resinate capable of being isolated in the form of a high melting point, permanently refusible, resin-like product which comprises dissolving a rosin containing at least about 7.5% of a rosin polymer in a solvent, incorporating into said solution a catalyst selected from the group consisting of organic acids soluble in rosin at the hereinafter specified reacting temperature whose acidity is due to a carboxylic acid radical, organic acids soluble in rosin at the hereinafter specified reacting temperature whose acidity is of a phenolic nature, and salts of said acids capable of reacting with abietic acid to liberate said acids, adding between 12 and 15% of zinc oxide by weight of said rosin thereto, heating the resultant mass to a temperature and for a time sufficient to complete the reaction between said rosin and the zinc oxide.

20. A stable, non-gelling solution of a zinc resinate capable of being isolated in the form of a high melting point, permanently refusible, resin-like product containing more than 3.8% of combined zinc.

21. A stable, non-gelling solution of a zinc resinate capable of being isolated in the form of a high melting point, permanently refusible, resin-like product containing from 3.8 to 10.8% of combined zinc.

ROBERT C. PALMER.
EDWIN EDELSTEIN.